United States Patent [19]
Nguyen

[11] Patent Number: 6,021,326
[45] Date of Patent: Feb. 1, 2000

[54] TRUNKED MULTI-SITE DISPATCH NETWORK FOR TRUNKING RADIOS

[75] Inventor: Hung L. Nguyen, Hurst, Tex.

[73] Assignee: Uniden America Corporation, Fort Worth, Tex.

[21] Appl. No.: 08/743,471

[22] Filed: Nov. 4, 1996

[51] Int. Cl.[7] .............................. H04B 7/00; H04Q 3/06; H04Q 7/28

[52] U.S. Cl. .................. 455/422; 455/426; 455/507; 455/520

[58] Field of Search ................................ 455/422, 426, 455/38.1, 507, 509, 511, 517, 518, 520; 370/338, 341, 389

[56] References Cited

U.S. PATENT DOCUMENTS

| | | | |
|---|---|---|---|
| 4,399,555 | 8/1983 | MacDonald et al. | 455/422 |
| 5,200,954 | 4/1993 | Teel, Jr. et al. | 370/338 |
| 5,203,015 | 4/1993 | George | 455/514 |
| 5,214,789 | 5/1993 | George | 455/440 |
| 5,497,508 | 3/1996 | George | 455/161.2 |
| 5,517,677 | 5/1996 | Moon | 455/161.1 |
| 5,613,201 | 3/1997 | Alford et al. | 455/18 |
| 5,634,196 | 5/1997 | Alford | 455/18 |
| 5,678,180 | 10/1997 | Mehta et al. | 455/422 |
| 5,850,611 | 12/1998 | Krebs | 455/518 |

Primary Examiner—Willis R. Wolfe
Attorney, Agent, or Firm—Sidley & Austin

[57] ABSTRACT

A system for networking dispatch-type of communications. A plurality of radio cells are coupled to a centralized hub controller via the public switched telephone network. The radio cells are networked together via the hub controller using one or more telephone voice lines and a respective data line for providing communications between each radio cell and the hub controller. Data packets are transferred between the radio cells and the hub controller on the data lines to set up a path for the dispatch communications on the telephone voice lines. The hub controller carries out a trunking function of the telephone voice lines so that the number of voice lines are minimized, while yet preventing blocking of dispatch communications.

30 Claims, 8 Drawing Sheets

TRUNKED MULTI-SITE DISPATCH NETWORK FOR TRUNKING RADIOS

TECHNICAL FIELD OF THE INVENTION

The present invention relates in general to fixed and mobile radio communications, and more particularly to methods and apparatus for carrying out dispatch-type of radio communications.

BACKGROUND OF THE INVENTION

The fixed, portable and mobile radio telecommunications field is a highly developed technology that enjoys a wide variety of applications. Many service businesses such as taxi, police, firemen, rescue squads, mobile service and maintenance repairmen, etc. constitute applications well adapted for fixed, portable or mobile radio communications. Such type of communications are easily and readily established, simply by operating a push-to-talk switch on the radio, receiving a confirmation "beep", and beginning the voice communications. The voice message is automatically broadcast to all the radio receivers assigned to the same group. When the voice communication is completed, the speaker simply releases the push-to-talk switch, and others in the group can then respond in a similar manner. Although only one radio of the group can transmit at a particular time in the dispatch mode, the period of transmission is generally short, thereby allowing others in the group to respond by activating their push-to-talk switches and speak accordingly. In this manner, and in contrast to mobile cellular telephones, no dial-up number or other similar connection is required and thus communications are easily initiated without having to remember or dial telephone numbers or memorize the various sequences that may be involved.

The push-to-talk radio communications described above are commonly known as "dispatch" radio communications. In such type of communications, a communication cell or site includes transmit/receive equipment for broadcasting the voice messages to the other mobile radios served by the cell. Indeed, each cell can include many distinct groups of radios so that the users of a particular group can communicate therebetween, without interfering with the communications of the other groups. In such type of arrangements, the cell includes a controller and a number of repeaters, generally up to twenty repeaters, which are trunked to provide the dispatch communications between the various groups within the cell.

Some types of fixed, portable and mobile communication radios are also available which provide both dispatch-type of calls and full duplex calls. In a full duplex communication call, a push-to-talk switch is not utilized. Rather, a bi-directional telecommunication path is maintained between the originating radio or telephone and the destination radio or telephone during the duration of the communication. Although the full duplex type of communication path allows for a continuous bi-directional exchange of voice messages, such path is dedicated during the time of use, and cannot be used by other mobile radios or equipment.

Each communication radio cell includes a transmit and receive antenna for providing communication services to the radios within a geographical radius of about 20–40 miles, depending upon the transmitting power, the terrain, weather, etc. The radio communication technology has advanced such that it is now possible to network a number of cells together, using the public switched telephone network (PSTN). In such an arrangement, the voice messages are transferred by way of voice-grade telephone lines or digital carrier lines from one cell to the other. However, the set-up of the voice path from one cell to the other is initially established by a data line between the cells and a modem for communicating set-up data information. Such type of arrangement is also highly useful where "roaming" of a radio is allowed from one cell to another cell. With the roaming feature, when the radio is turned on, data is periodically transmitted from the radio to the nearby cell. When a cell detects the new appearance of a mobile radio, it broadcasts the location of the radio, via a data line, to the other cells of the network. In this manner, all cells of the network can update appropriate tables to maintain an account of the location of the various radios.

While the use of a full duplex radio communication link to network plural cells together is relatively easy, namely, maintaining the voice line off-hook during the entire bi-directional exchange of voice signals, the networking of a dispatch-type of calls between plural cells becomes much more difficult. Indeed, although it is not uncommon to network a first radio cell by way of telephone voice lines with a second radio cell for dispatch communications, the networking of more than two cells becomes very complicated. This is due primarily to the number of different push-to-talk conversations or messages that generally take place in order to complete the overall exchange of information. Moreover, the time delay in transferring the "key" commands and "dekey" commands (that initiate and terminate the push-to-talk message) becomes significant, and indeed increases as the number of networked cells increase. Moreover, an algorithm to resolve conflicts in simultaneous transmission attempts becomes much more complex as the number of networked cells increase.

From the foregoing, it can be seen that a need exists for a technique for networking plural cells together to easily and efficiently carry out dispatch-type of radio communications. A further need exists for a radio telecommunications system having a hub controller for controlling the usage of voice lines between cells of a network to coordinate dispatch-type messages. Another need exists for a method of communicating data commands between originating radio cells and destination radio cells to accommodate the communication of different groups of users serviced by the network.

SUMMARY OF THE INVENTION

In accordance with the principles and concepts of the invention, there is disclosed a radio telecommunication system that overcomes or reduces the shortcomings and disadvantages of the prior art systems. In accordance with a primary aspect of the invention, a plurality of cells are arranged in a network, where each cell employs plural repeaters for trunking the frequency channels to optimize service for the radios. The trunked cells are networked together, preferably with off-hook telephone lines, that are trunked by a hub controller to optimize communications between the cells.

In a preferred form of the invention, the hub controller is programmed to carry out an initialization procedure, whereby each cell is accessed by the controller via a data line to cause the cell to respond via a voice telephone line to thereby establish off-hook voice and data lines therebetween. Each of the other cells is networked in a similar manner to the hub controller so that each cell is coupled to the controller by a data line and at least one voice telephone line. In practice, and based primarily on the traffic patterns, each cell is networked to the hub controller by plural off-hook voice telephone lines. The hub controller is also programmed to maintain a busy/idle table of the status of each of the voice telephone lines of each of the respective cells. The hub controller also includes a voice bridging network that allows a dispatch voice message from an originating cell to be broadcast to all of the cells on a selected voice telephone line. With this arrangement, the hub controller carries out a trunking function of the voice telephone lines in connecting the cells together to transfer or broadcast dispatch-type of communications from an originating cell to the plural destination cells of the network.

In accordance with another feature of the invention, the broadcasting of push-to-talk voice messages can be achieved with respect to distinct groups of radios. Each radio key or dekey request transmitted by an originating cell, via the data line to the hub controller, is associated with a corresponding group identification number. In this manner, by transferring group identification numbers with the requests, the associated voice messages can be separately routed for different groups, and transmitted only to the associated destination groups.

BRIEF DESCRIPTION OF THE DRAWINGS

Further features and advantages will become apparent from the following and more particular description of the preferred embodiment of the invention, as illustrated in the accompanying drawings in which like reference characters generally refer to the same parts or elements throughout the views, and in which.

DESCRIPTION OF THE PRIOR ART

Figure 1:
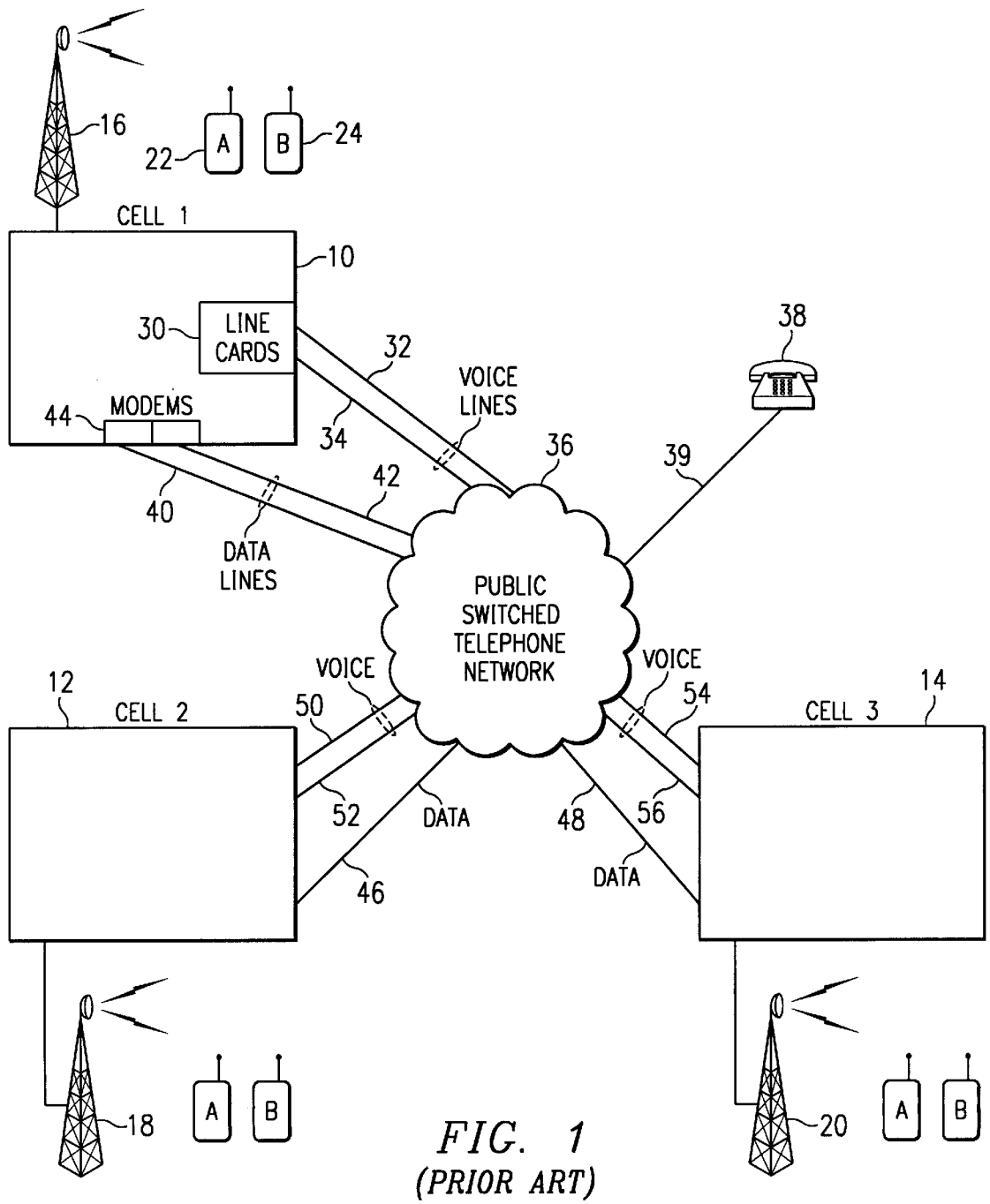
FIG. 1 is a generalized block diagram of a network of radio cells adapted for providing full duplex communications.

With reference to FIG. 1, there is illustrated a conventional arrangement for networking plural radio cells together to carry out full duplex communications. Such a system is exemplary of the prior use of data lines and voice lines for networking plural radio cells together. Shown are three radio cells 10–14, each providing transmit/receive communication capabilities via respective antennas 16–20 to corresponding transceiver radios, shown generally as reference characters 22 and 24. In the example, the radio 22 comprises a first group of plural radios that can communicate between each other, and radio B illustrates another group that can communicate in like manner. The group A radios 22 cannot communicate with the group B radios 24. The group A radios 22 can communicate together at the same time as the group B radios 24 communicate with each other in the group. In practice, many other groups can co-exist independently, up to as many as 255 groups. The transmission protocol of the cells 10–14 may be of many different types, including the standard LTR protocol as well as the Enhanced Sub-Audible Signaling (ESAS) protocol developed by Uniden America Corporation, Fort Worth, Tex. The ESAS protocol specification document X-WP-0004G-2/93 is incorporated herein by reference. Other radio configurations, network topologies and protocols are available and well known in the art. However, FIGS. 1 and 2, as well as the invention described below, will be described in connection with ESAS-type cell architectures and corresponding protocols.

In FIG. 1, there is shown a first radio cell 10 having conventional line cards 30 connecting one or more voice telephone lines 32, 34 to the public switched telephone network (PSTN) 36. The voice lines 32, 34 can be either analog or digital carrier lines. The telephone network 36 is coupled to conventional telephone sets 38, as shown. In addition to the voice lines 32 and 34, the radio cell 10 is connected to the telephone network 36 by other data lines 40 and 42. The data lines 40 and 42 can also be typical telephone lines, or other types of lines, connected to modems 44 that are controlled by the radio cell 10. While not shown, the radio cell 10 includes other conventional circuits and equipment, such as trunked repeaters and a programmed controller or processor to coordinate the radio communications between the fixed, portable or mobile radios associated therewith. The other radio cells, such as the second cell 12 and the third cell 14, are similarly equipped, with at least one respective data line 46 and 48, and one or more voice lines 50 and 52 for the second cell 12 and 54 and 56 for the third cell 14. Although the networked cells shown in FIG. 1 are adapted for full-duplex radio communications, it is believed that such architecture is currently not adapted or utilized for dispatch-type of radio communications. In any event, the prior art network radio system of FIG. 1 is illustrated for purposes of comparison with the principles and concepts of the invention.

The radio cell network shown in FIG. 1 is well adapted for providing full duplex radio communications. In such type of communications, the radios 22 and/or 24, whether they be fixed, portable or mobile, must be equipped for full duplex operation. In such type of operation, a bi-directional voice path is established, whereby two speakers can talk at the same time. This contrasts with dispatch-type of communications, where only one party can speak at one time while the push-to-talk switch is depressed, and all other transceiver radios in the group are automatically configured as receivers and locked out of the transmission mode. It is noted that conventional telephone sets, such as shown by numeral 38, are adapted for full duplex communications using the tip and ring subscriber lines 39.

It is assumed, for purposes of example, that a full duplex call is initiated by the telephone set 38 to mobile radio 22 of group A, which is associated with the first cell 10. The person initiating the call simply dials the telephone number associated with the group A on the telephone set 38, whereupon the DTMF tones or pulses are coupled via the telephone line 39 to the public switched telephone network 36. The telephone network 36 then sends a ringing signal on an idle line 32 to the first cell 10. The processor (not shown) of the first cell 10 senses the ringing signal via circuits in the line card 30, and selects a vacant channel repeater for use in communicating with the radio 22 of group A. It is noted that each different group of radios can be assigned different directory numbers, whereupon the processor can determine which group is the destination based on the particular line on which ringing is sensed. When an idle radio channel and corresponding repeater are found by the processor, the ringing on the telephone line 32 is tripped, and both the public telephone network 36 and the radio cell 10 couple the voice signals between the telephone set 38 and the radio 22 of group A. Bi-directional or full duplex communications can then be carried out for the duration of the telephone call. Importantly, the telephone voice lines 32 and 34 employed in the full duplex communication mode are dedicated solely to the called party and the calling party and cannot be used by any other party, even if the telephone line is then silent, i.e., no transmission of signals by either party. When the telephone set 38 is placed on-hook, the telephone voice lines are idled and can be dedicated to a subsequent call.

The networked cell architecture of FIG. 1 can be operated for allowing the first radio cell 10 to transfer the incoming call to another cell, if it is found that the called party is not in the broadcast area of the first cell 10. In this event, a "roaming" feature is often utilized, whereby tracking tables are utilized in each cell to maintain an account of where each radio is presently located. Each radio, whether it be portable or mobile, is assigned a unique identification (UID) code. Each group of radios is assigned the same group identification (GID) code. Further, each mobile radio is programmed so that when placed in an operational mode, although not in a talk or listen mode, such mobile radio periodically transmits its UID and GID on, for example, a home channel. On the reception of the periodic transmission by a radio cell, such cell interrogates its tracking table to determine if the mobile radio is presently listed therein. If the mobile radio is not listed in the tracking table, the cell then registers the UID and GID within the tracking table, and broadcasts a data message via a data line to all other cells in the network. The data transmission broadcast to the other cells is accompanied by the identification of the transmitting cell so that the other cells of the network can update their respective tracking tables to indicate that the mobile radio is presently in the transmitting vicinity of a new cell.

In this manner, if an incoming telephone call from the telephone set 38 was initially directed to a mobile radio of the first cell 10, such cell would consult its tracking table to determine if indeed the mobile radio was presently within its vicinity. If so, the full duplex talking path is established as described above. If not, the first cell 10 then determines from its tracking table with which cell the mobile radio is presently associated. Then, the first cell 10 out dials on an idle voice line 34 the telephone number of the associated cell, such as cell 3. When the processor of radio cell 3 senses the ringing on the voice telephone line 56, via a respective line card (not shown), the voice line is placed on an off-hook condition and ringing is tripped. The processor in the first cell 10 then causes DTMF signaling on the selected voice line 34 to thereby out pulse the UID code and the GID code for the mobile radio of the called party. Various handshake signals are exchanged, and the full duplex talking path is established.

The specific talking path of the example is from the telephone set 38 to the public telephone network 36 via subscriber line 39, from the public telephone network 36 to the first cell 10 via the voice telephone line 32, from the first cell 10 back to the public switched telephone network 36 via the third voice telephone line 34, and lastly from the public switched telephone network 36 to the third cell 14 via the fourth voice telephone line 56. As noted above, the networking of full duplex type of communications between more than two networked cells becomes cumbersome, time consuming and wasteful of resources.

Figure 2:
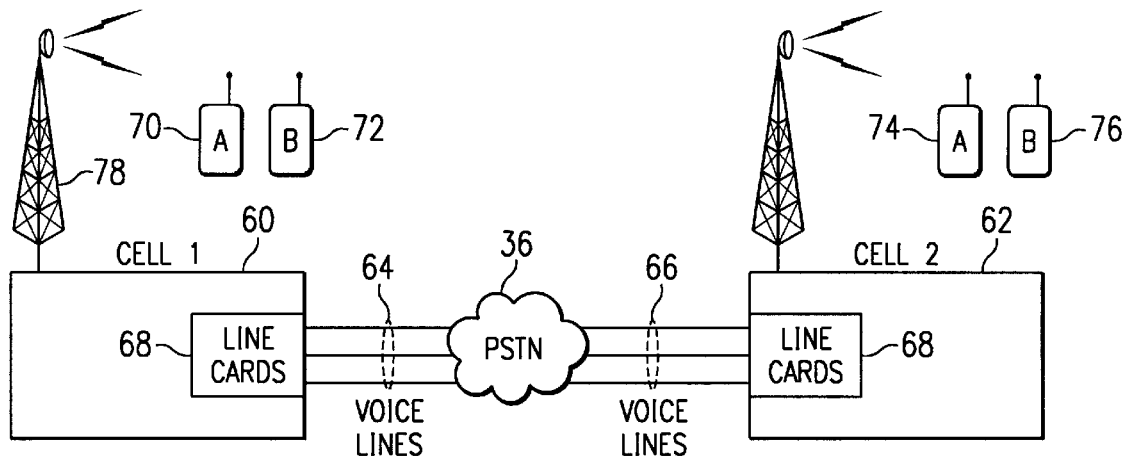
FIG. 2 is a generalized block diagram of a two-cell radio network topology for carrying out dispatch communications.

With regard to FIG. 2, there is shown the conventional networking of two radio cells 60 and 62 connected to the public switched telephone network 36 by respective voice lines 64 and 66. Each cell includes line interface circuits or cards 68 for providing communication of signaling and voice information. It is noted that the voice lines 64 and 66 can be either analog or digital carrier lines adapted for carrying voice signals. It is assumed for purposes of example that the radios 70 of group A and radios 72 of group B, both associated with the first cell 60, are equipped for simplex or push-to-talk communications. In like manner, the radios 74 of group A and 76 of group B associated with the second cell 62 are also equipped for dispatch communications.

Typically, a dispatch-type of communication carried out with regard to the first cell 60, is as follows. When one radio 70 of group A desires to speak to the other radios in group A, the operator of the originating radio simply presses the push-to-talk switch. The programmable circuits in the radio 70 cause it to select a free or idle channel by either decoding a "free repeater" message on the home channel, or by monitoring the channel for "no activity" for a specified period of time. The processor or controller in the first radio cell 60 receives the communication via the radio channel and antenna 78, and also receives the UID and GID codes of the transmitting radio via such transmission. The processor in the first cell 60 then transmits an acknowledgment packet to the keyed radio via the selected idle radio channel and corresponding repeater. The keyed radio 70 provides an audible acknowledge beep to the radio operator. The repeater is also caused to transmit a digital message to the destination radios of group A in the cell indicating the channel number to be employed. When the operator of the originating radio receives the audible beep, he or she simply speaks into the radio, whereupon the first cell 60 broadcasts the voice message to all the other destination radios in the group. When the operator of the originating radio is finished with the voice message, the push-to-talk button is released, whereupon the originating radio automatically transmits a dekey message to the radio cell 60. This idles the system whereupon any transceiver radio in the group can thereafter be keyed and respond to the first voice message. Should another person in the group key his/her radio, the data message is received by the first radio cell 60, and another idle repeater is selected. This type of back and forth dispatch communication is continued for each key actuation and de-actuation of the transceiver radio to thereby allow a single one-way communication at a time. It is well known in the art that the number of repeaters and corresponding channels employed in a radio cell are fewer than the number of transceiver radios associated with the cell, whereby trunking of the repeaters and channels optimizes the efficiency of the system.

It can be seen that the dispatch-type of communication is more complex than the full duplex operation described in conjunction with FIG. 1, as a new communication path must be found and established each time the push-to-talk switch of a transceiver radio is actuated. Further, the processor in the radio cell 60 must be programmed to resolve conflicts between contention of two or more radios requesting simultaneous access to a communication channel. This possible conflict is resolved by selecting the strongest broadcast signal.

In the operation of the two-cell network dispatch communication shown in FIG. 2, it is assumed that the transceiver radio 70 in group A is keyed. The automatic transmission of the UID and GID codes by the radio 70 is received by the antenna 78 and processed by the radio cell 60. In many radio systems, and as noted above, the initial transmission by the keyed radio occurs by selecting an idle channel by decoding a free repeater message on a home channel, or by monitoring a channel for no activity for a specified period of time. After the keyed radio has selected an idle repeater and channel, an audible beep is provided to the person so that voice communications can begin. At the same time, an idle voice telephone line 64 is selected or allocated by the cell 60. A seven-digit or other directory telephone number is dialed on the voice line 64 to the public switched telephone network 36. The directory number uniquely identifies the destination cell 62 to which dispatch communications are to be exchanged. When the telephone network 36 cuts through to the destination cell 62 via another voice line 66, ringing is applied and the destination cell 62 thereafter goes off-hook to thereby trip ringing. In response to the tripping of audio ringing, the originating cell 60 transmits a DTMF password to the destination cell 62 over the voice lines 64 and 66. The password or code indicates that a dispatch call is being set up from the originating cell 60 to the destination cell 62. In addition to the password, a group ID (GID) code is transmitted by DTMF digits. In response to the DTMF transmission, the destination cell 62 selects an idle repeater and radio channel for the GID code. The voice communication in response to the keying of the originating radio 70 is thus transmitted by the originating cell 60 to all the other radios in the group in the vicinity of such cell 60. In addition, the voice signals are transmitted by way of the line interface cards 68 via the voice lines 64 and 66 to the destination cell 62. At the destination cell 62 the voice signals are transmitted to all of the transceiver radios 74 in group A.

In accordance with the operation of conventional radio transceivers, the GID codes are transmitted along with the voice signals according to the standard protocols, such as the LTR protocol, the ESAS protocol, etc. When the originating mobile radio 70 releases or dekeys the push-to-talk switch, a dekey code is automatically transmitted from such radio 70 to the originating cell 60. The dekey code is then transmitted by DTMF signals to the destination cell 62 and retransmitted to the radios 74 of group A in the vicinity of cell 62. It is noted that the other radios of group A in the vicinity of the originating cell 60 also receive the dekey code. According to standard radio communications, the repeaters and associated channels of the originating cell 60 and the destination cell 62 are released for use for subsequent radio transmissions. However, the voice lines 64 and 66 are maintained for a predetermined dwell time, such as for ten minutes, in the absence of any subsequent transmission by a radio in group A. Indeed, any other radio in another group can also utilize the idle voice lines 64 and 66 for the networking of dispatch communications. In the event that two or more simultaneous dispatch transmissions are networked, additional voice lines can be seized to provide additional dispatch communications between the originating cell and the destination cell.

As can be appreciated, DTMF key codes, dekey codes and other types of codes are required to be transmitted between the originating cell and the destination cell in a network dispatch communication. Further, the processors in the cells must be programmed to resolve conflicts of simultaneous requests, maintain the busy status of voice lines as well as repeaters when a request is received. Moreover, in practice there are transmitted between the originating and destination cells acknowledgment signals with regard to the talk mode, listen mode and idle mode.

It can be seen that when adding a third cell to the network of dispatch communications, the signaling problem is exacerbated, to the extent that the transmission and reception of the many DTMF codes and acknowledgments cause a time delay sufficient to interfere with the voice signals. Indeed, initial syllables or words spoken by the originating party may not reach the destination cell, due primarily to the intermediate exchange of signaling and acknowledgment codes. By using inband DTMF signals, the reception and decoding thereof may involve delays up to several seconds in a two-cell network dispatch communication. The methods and apparatus for overcoming this problem are set forth below.

DETAILED DESCRIPTION OF THE INVENTION

Figure 3:
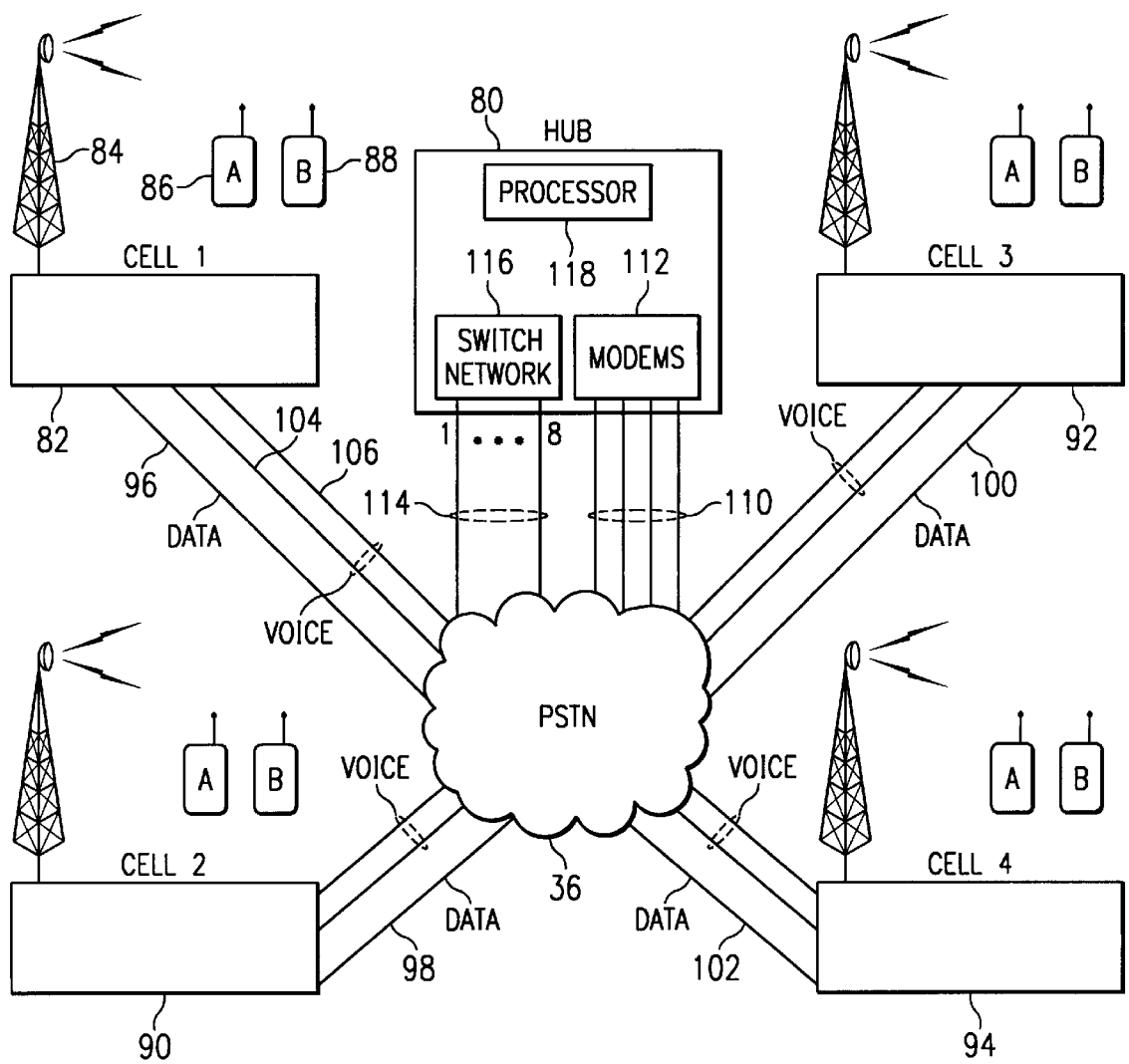
FIG. 3 is a generalized block diagram of the invention, in which a hub controller is employed for coordinating the trunking of telephone lines between the radio cells.

In accordance with the preferred embodiment of the invention, there is illustrated in FIG. 3 a number of radio cells networked together to provide dispatch-type of radio communications. The area of communications coverage constitutes the composite of the area serviced by the individual radio cells. According to the preferred form of the invention, a hub arbitrator 80 coordinates the dispatch communications between each of the cells. According to the network configuration shown in FIG. 3, each radio cell, for example, cell 1 identified by reference numeral 82, includes the conventional equipment such as a transmit-receive antenna 84, radio transceivers of one or more groups, such as group A 86 and group B 88, as well as other groups (not shown). The cell 82 includes conventional controllers adapted for trunking a number of repeaters to provide push-to-talk communications between the radio transceivers of a group. While not shown, the radio cell 82 may include additional equipment for carrying out full-duplex communications, etc. The other radio cells, such as cell 90, cell 92 and cell 94 are also similarly equipped.

Each radio cell is connected to the public switched telephone network 36 by way of a respective data line 96–102. Only a single data line per radio cell is necessary for connection to the PSTN 36 for carrying data signals. Each data line 96–102 can be a standard telephone line for carrying modem-generated data signals at a data rate of at least 9600 bits per second. In addition to a data line, each radio cell is connected to the public switched network 36 by one or more telephone voice lines, such as voice lines 104 and 106 connecting respective voice ports of the first radio cell 82 to the public switched telephone network 36. Each radio cell is not required to have the same number of telephone voice lines as the other cells in the network. Rather, the number of telephone voice lines needed is largely a matter of the radio traffic encountered by the individual radio cells. Where a radio cell has a large amount of dispatch-type of communication traffic, such cell will be provided with more telephone voice lines than another cell in the network that experiences less dispatch-type of communications traffic. In the detailed description of the invention which ensues, it will be assumed that each radio cell is structured to operate with the ESAS protocol noted above. However, the principles and concepts of the invention are equally applicable to other types of radio systems operating with different protocols.

In accordance with an important feature of the invention, the hub arbitrator 80 is connected to the public switched telephone network 36 by way of plural data lines 110. Indeed, in the preferred form of the invention, there is one data line 110 for each radio cell connected as a network. In view that there are four radio cells shown in the example in FIG. 3, there are four corresponding data lines 110 connecting the hub 80 to the PSTN 36. Each data line 110 is connected to a respective modem 112 of the hub arbitrator 80. The modems 112 of the hub 80 are preferably of the same speed as the corresponding modems (not shown) that connect each cell data line to the processor of the radio cell.

The hub arbitrator 80 also includes plural telephone voice lines 114 connected to the PSTN 36. In the preferred form of the invention, for each telephone voice line connecting a radio cell to the PSTN 36, there is a corresponding telephone voice line 114 connecting the PSTN 36 to the hub arbitrator 80. In the example shown in FIG. 3, since each of the four radio cells has two telephone voice lines connected to the PSTN 36, the hub arbitrator 80 includes at least eight telephone voice lines 114 connected to the PSTN 36. Each telephone voice line 114 of the hub arbitrator 80 is connected to an N×N switching network 116 for connecting any one of the telephone voice lines 114 to any of the other telephone voice lines thereof. In the preferred form of the invention, the switching network 116 is of the type adapted for connecting one incoming telephone voice line 114 to plural outgoing telephone lines 114 to provide a broadcast capability of voice signals. Switched networks 116 of such type are conventionally available with AG8 printed circuit cards obtainable from Natural Microsystems. In such type of circuits, the analog voice signals are converted to corresponding digital signals, switched to the desired output lines, and then reconverted to analog signals for transmission on the desired output lines directed to the PSTN 46. Other types of switching networks can function with equal effectiveness.

The hub arbitrator 80 also includes a program-controlled processor 118 that is programmed to operate in several modes to coordinate dispatch-type of communications between the various radio cells. Indeed, the hub arbitrator 80 can itself be any of the numerous conventionally available personal computers that can accommodate modems 112 and can support circuit cards, such as the switch network 116. In accordance with an important feature of the invention, the hub arbitrator 80 is programmed to operate in various modes. In an initialization mode, the hub arbitrator 80 sequentially communicates to each radio cell via a respective data line to establish each of the telephone voice lines in an operational off-hook condition. The off-hook condition can be maintained permanently, or for a programmed long period of time, or placed in an on-hook condition after a predefined period of inactivity. When all of the telephone voice lines to each of the radio cells is off-hook, dispatch-type of voice signals can be passed from an originating radio cell and broadcast to plural destination radio cells, all under the control of the hub arbitrator 80. Further, the push-to-talk commands, such as commands indicating the transceiver radio switch has either been pushed, or released, and other commands, can be passed between the respective cells and the hub arbitrator 80. In this manner, the hub arbitrator 80 functions as a master device in transferring the voice signals from one cell to the other cells via the PSTN 36. It should be noted also that as to each individual cell, it operates autonomously in providing transmit and receive signals between each of the transceivers served directly by such cell. However, when such signals are transferred to the other radio cells in the network, the hub arbitrator 80 selects the various telephone voice lines for transferral of the voice signals to be broadcast to the destination cells. To that end, the hub arbitrator 80 essentially carries out a trunking function with regard to the telephone voice lines that connect each radio cell to the public switched telephone network 36.

The hub arbitrator 80 generally operates in the initialization mode only when bringing the hub on line with regard to the radio cells. However, should a new radio cell be added subsequent to the initialization of the overall system, a portion of the initialization routine can be carried out to initialize the new radio cell. As will be described below, if a data line or voice line is placed on-hook for any reason, portions of the initialization routine can be executed to again place the lines off-hook and in an operational mode to carry information for dispatch communications.

Subsequent to the initialization mode, the hub arbitrator 80 is placed in a conversation mode. In the conversation mode, the hub arbitrator 80 detects data signals on the respective data lines indicating that a transceiver radio has been keyed in the vicinity of one radio cell. Idle telephone voice lines can then be selected to transmit the voice signals via the PSTN 36 to the other radio cells. As will be set forth more fully below, when the hub arbitrator 80 receives a radio key command on a data line, idle telephone voice lines directed to the other radio cells are selected. When the hub arbitrator 80 receives a dekey command, the respective telephone voice lines are then idled and can thereafter be used for servicing the transceiver key commands of other radios. The dekey commands of communication radios are processed in accordance with an end of transmission mode carried out by the hub arbitrator 80. In this manner, the hub arbitrator 80 allows the networking of dispatch type of radio communications amongst two or more radio cells. The various transmission protocols and formats, as well as the software routines of the hub arbitrator 80 are described in detail below.

Figures 4, 6:
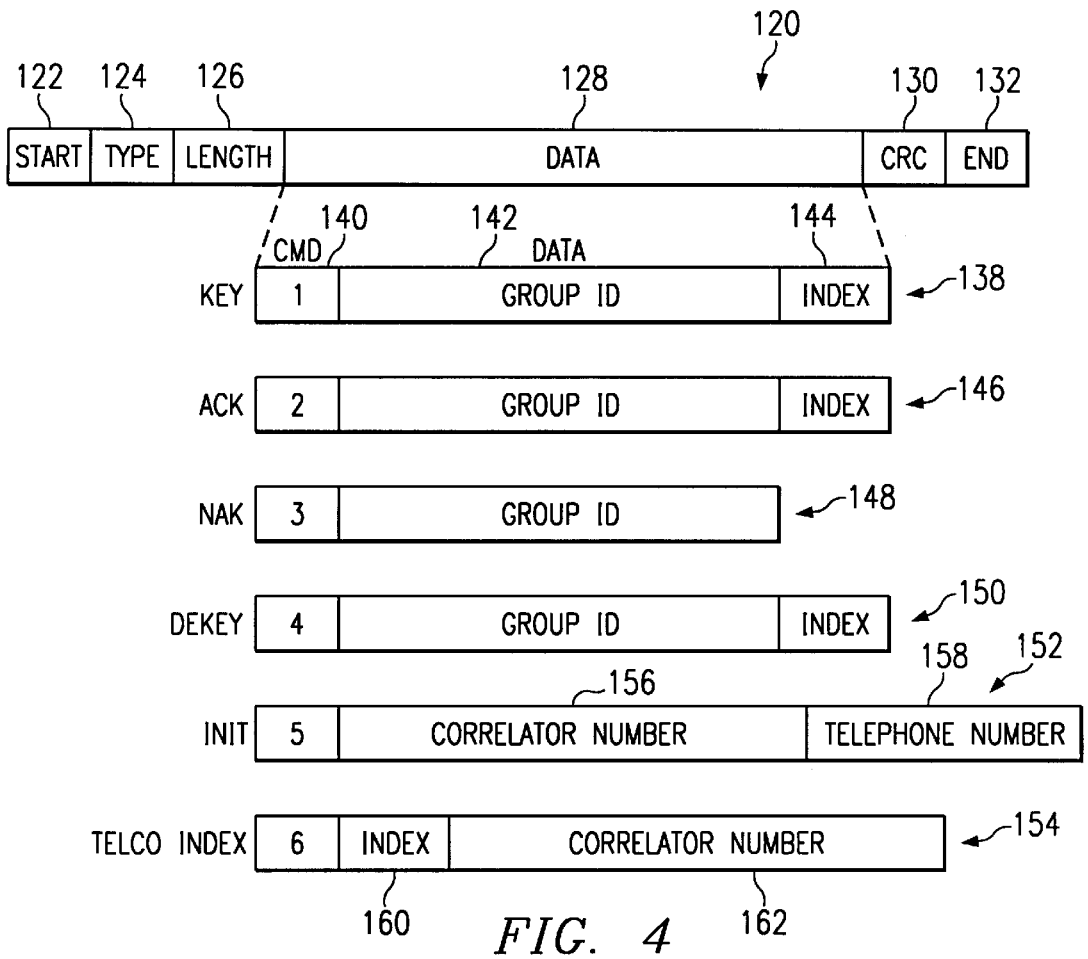
FIG. 4 is a drawing showing the various fields of the data packet frame employed in initializing the networked radio system and carrying out dispatch communications.
FIG. 6 is a diagram illustrating a cell voice line index table maintained in the hub controller.

With reference to FIG. 4, there is illustrated the format of the data frame 120 transmitted between the hub arbitrator 80 and each of the radio cells 82 and 90–94. The data format of FIG. 4 is appropriately transmitted by the modems in each of the radio cells via the respective data lines 96, 98, 100 and 102, to the corresponding modems 112 of the hub arbitrator 80. A frame 120 transmitted on the data lines includes a one-byte start field 122 which, when decoded, indicates the start of a frame of data. In the preferred form of the invention, the start byte is hexadecimal "02." The subsequent byte of transmitted data in field 124 identifies a type of communication. When the type field 124 is equal to unity, a dispatch-type of communication is identified. Next, two bytes of data identify a data length field 126. The length field 126 identifies the number of bytes of data that exist in a data field shown as reference numeral 128. The data field 128 is thus variable in length and contains as many bytes of data as dictated by the numerical count in the length field 126. A two-byte field 130 is for error checking purposes. When decoded, the CRC error check field 130 determines whether the integrity of the data frame 120 is intact. Lastly, a one-byte field 132 identifies the end of the data frame 120. In the preferred form of the invention, the end byte 132 is numerically equal to hexadecimal "03."

As noted above, the data field 128 is variable in length. In order to carry out the dispatch communication, it has been found that six types of data fields are convenient. Each data field 128 includes a one-byte command (CMD) field, followed by the data associated with the command. Data field 138 identifies a key command, in which the command field is equal to binary one. The key data field 138 is transmitted in response to a transceiver radio being keyed to transmit voice communications. In the data portion 142 of the key data field 138, there are four bytes of data allocated to the group identification (GID) of the group in which the transmitting radio is assigned. Two bytes of data identify an index field 144 to identify the particular telephone voice line on which dispatch communications are to be carried out in response to the key command. Data is placed in the index field 144 by the hub arbitrator 80. In all of the types of data fields 128 identified by different commands in field 140, an index field 144 is only utilized when such command is transmitted by the hub arbitrator 80. As noted above, it is the hub arbitrator 80 that carries out a trunking function of the telephone voice lines to be utilized in the networking of dispatch communications.

An acknowledge (ACK) data field 146 shown in FIG. 4 is characterized by the binary "2" in the command field 140. Again, four bytes of data identify the group ID and two bytes of data indicate the index of the telephone voice line to be utilized. The acknowledge (ACK) data field 146 is a transmission that constitutes a "handshake" showing that the intended communications can be completed.

Included in the data formats is a negative acknowledgment (NAK) data field 148. The command field 140 having the binary number "3" identifies the NAK data field 148. The NAK data field is not followed by a field containing the index of the telephone voice line.

A "dekey" data field 150 is identified by the binary number "4" inserted in the command field 140. The dekey command includes a four-byte group ID field 142, followed by a two-byte index field 144. The dekey command is employed as a data transmission when the push-to-talk button of a radio transceiver has been released. The dekey command is thus effective to idle the communication medium and allow it to be subsequently used for a new key command.

As noted in FIG. 4, the initialization (INIT) data field 152 includes a command field 140 with the binary number "5." A five-byte field 156 includes a correlator number assigned by the hub arbitrator 80 to a particular radio cell during the initialization mode. The correlator number field 156 includes a random number generated by the hub arbitrator 80. Also in the initialization data field 152 is a telephone number field 158. The telephone number field 158 is a 32 byte field for containing the directory telephone number assigned by the public switched telephone network 36 to the hub arbitrator 80. Accordingly, when the hub arbitrator 80 transmits a frame of data to a radio cell over a data line, which frame has the initialization data field 152, the radio cell is thereby assigned a unique correlator number in field 156, as well as the telephone number of the hub arbitrator 80 in field 158. Thus, when a radio cell establishes a telephone connection to the hub arbitrator 80, such connection can be established by the radio cell dialing the directory number that exists in the field 158. When the public switched telephone network 36 applies ringing signals to the telephone line 114 assigned the telephone number in the field 158, the hub arbitrator 80 can respond to the ringing and trip the same to establish a off-hook voice line between the particular radio cell and the hub arbitrator 80.

Lastly, a Telco index data field 154 is identified by the binary number "6" in the command field 140. A two-byte index field 160 again identifies the index number of the telephone voice line that is to be utilized by the particular radio cell. A correlator number field 162 constitutes a five-byte field for carrying a correlator number assigned by the hub arbitrator 80.

From the foregoing, it can be appreciated that every data transmission on a data line, such as line 96 of FIG. 3, incorporates the frame 120 of FIG. 4 with one of the six types of data fields. The particular data field utilized is based on the type of command which is assigned either by the processor in the radio cell, or the programmed processor 118 in the hub arbitrator 80, depending upon which processor is the transmitter.

Figure 5A:
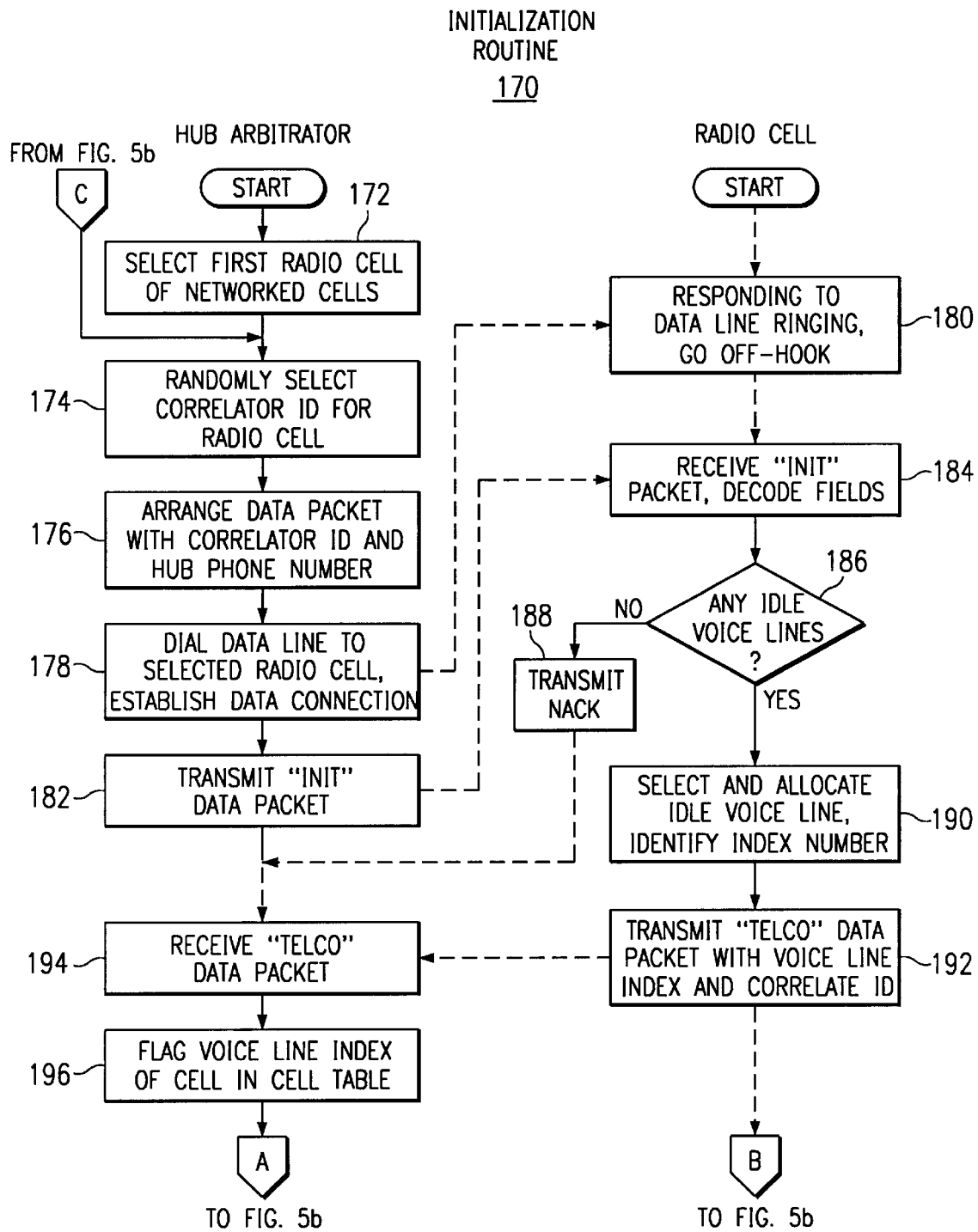
FIGS. 5a and 5b are program flow charts of an initialization routine employed by the hub controller and the cell processors for initializing the network system.
Figure 5B:
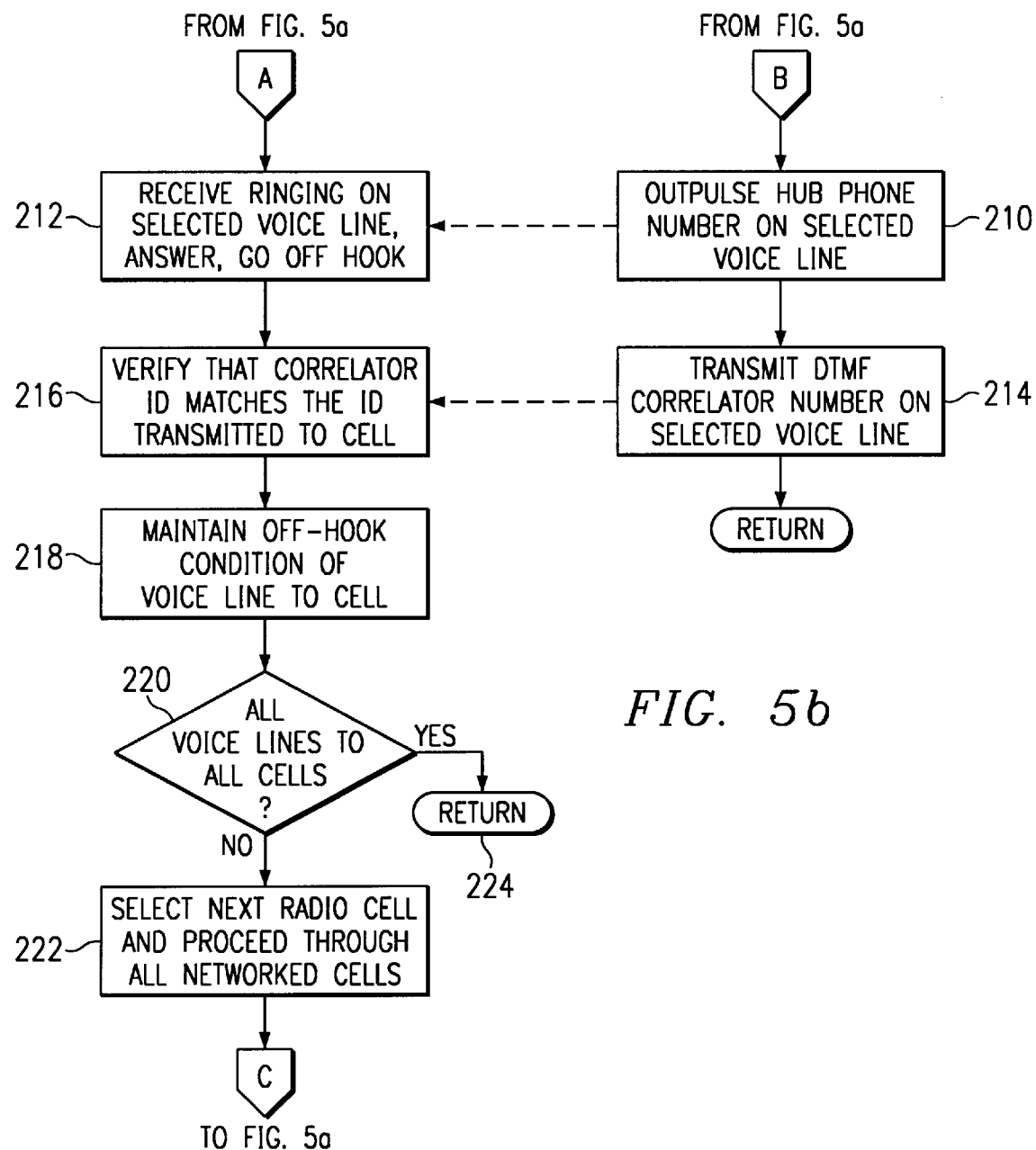

The initialization routine carried out by the processors of the radio network of FIG. 3 is shown in software flow chart form in FIGS. 5A and 5B. The left-hand portions of the flow charts of FIGS. 5A and 5B illustrate the programmed operations of the hub arbitrator 80, while the flow chart portions on the right hand side are the software operations carried out by the radio cells during the initialization procedure. The broken lines between the left and right-hand portions signify a cause and effect relationship between the programmed actions of the hub arbitrator 80 and the radio cells. In the preferred embodiment of the invention, the program language of the hub arbitrator 80 is C++, and the program language of the software in each radio cell is C. As noted above, the initialization procedure is carried out after the radio cells have been installed and are operational themselves, and during the initial period in rendering the network as a whole operational. It should be noted that in the preferred embodiment, the initialization routine 170 constitutes software programmed into both the hub arbitrator 80 and each of the radio cells to assure that each data line and telephone voice line is operational, as well as to identify the various voice lines with index numbers. As will be described below, an administrator or craftsperson is involved with the control of the hub arbitrator 80, via a keyboard, during the initialization phase to assure that all voice and data lines are initialized. While the software programming of the initialization routine allows the procedures to be automatic, those skilled in the art may prefer to manually test the lines for functionality and program into the hub and the radio cells the data and identities generated during the initialization phase. To that end, the carrying out of the initialization phase using software is not an absolute necessity to the utilization of the invention.

With reference to FIG. 5A, the hub arbitrator 80 commences the initialization routine at the start thereof, by prompting the administrator to select the first radio cell of the group of networked cells. This is shown in program flow chart block 172. Each radio cell of a network can be uniquely identified by a number or code that is initially entered into the hub arbitrator 80 by the administrator. Next, the hub processor 118 randomly selects a correlator identification number for each of the plural radio cells, as shown in block 174. The hub processor 118 then arranges a data packet with a correlator ID and the phone number of the hub arbitrator 80. The initialization data packet is identified by a command field equal to binary five, with the correlator number and telephone number as shown in data packet 152 of FIG. 4. The step of arranging the INIT data packet 152 is shown as program flow block 176. In program flow block 178, the hub arbitrator 80 outpulses on data line 110 the DTMF digits corresponding to the directory telephone number assigned to the first radio cell 82, as shown in FIG. 3. The public switched telephone network processes the directory number and provides ringing on a corresponding data line 96 coupled to the cell 82. With regard to the radio cell 82 operation shown on the right hand side of FIG. 5A, such cell responds to the ringing on the data line 110, and places the line in an off-hook condition. Ringing is thus tripped. This is shown in program flow block 180. When the data line 110 has been placed in an off-hook condition by the radio cell 82, the hub arbitrator 80 transmits the INIT data packet 152 in the data frame 120, as noted in program flow block 182. The INIT data packet 152 is transmitted over the selected data line 96, and is received by a modem (not shown) in the radio cell 82. This is shown in program flow block 184, where the radio cell 82 decodes the various fields of the data frame 120. The processor in the radio cell 82 is programmed to respond to the INIT data field by finding an idle telephone voice line 104 or 106. Preferably, the radio cell processor is programmed to sequentially proceed from the first telephone voice line through each of the voice lines that connect such cell to the public switched telephone network 36 (shown in FIG. 3). In decision block 186, the radio cell 82 determines whether any of the telephone voice lines are idle. If not, processing branches to program flow block 188 where a NAK data frame is transmitted on the data line 96 back to the hub processor 118. While not shown, the hub processor 118 is programmed to then retransmit the INIT data packet, as shown in block 182, at a later time in an attempt to continue the initialization routine.

When an idle telephone voice line is found by the radio cell processor according to decision block 186, processing branches to block 190 where the idle telephone voice line 104 is selected and allocated. Further, the radio cell processor accesses a look-up table, or other type of reference table, to find the index number of the selected telephone voice line 104. In program flow block 192, the radio cell processor arranges a Telco data packet with the voice line index and the correlator ID in the respective data fields 160 and 162, as shown by the Telco index data field 154 (FIG. 4). The correlator ID is the same random number transmitted from the hub arbitrator 80 to the radio cell 82 in the field 156 of the INIT data packet 152.

In program flow block 194, the hub processor 118 receives the Telco data packet 154 by way of a hub modem 112. The hub modem decodes the Telco data packet 154 and in program flow block 196 the hub processor 118 flags the voice line index number with the particular radio cell 82. The hub processor 118 maintains a cell index table, such as that shown in FIG. 6. The cell index table 200 includes an identity of each radio cell operating in the network for carrying out dispatch-type of communications.

In the table 200 shown in FIG. 6, there are an exemplary eight radio cells in the network. Associated with each radio cell are plural entries corresponding to the number of telephone voice lines connecting that particular radio cell to the public switched telephone network 36 and therefrom to the hub arbitrator 80. According to the voice line index table 200, radio cell six has only one voice line with an index number of "01." Radio cells 1–3 and 8 each have two voice lines with appropriate index numbers, and radio cells 4 and 7 each have three voice lines. Lastly, radio cell 5 has four voice lines. As will be described below, the entries in the index table 200 can be flagged to note when a particular voice line of a radio cell is busy. For purposes of clarity, each table entry of each cell is shown flagged as busy. The dash marks in the table entries signify that there is no voice line that exists for that entry. As noted above, it is not necessary that each radio cell have the same number of telephone voice lines. Rather, the number of telephone voice lines assigned to each cell depends upon the dispatch traffic needs of such cell. For example, where a particular cell has very few groups and very few transceiver radios, such as cell 6 in the table 200, such cell can operate on a few telephone voice lines without encountering numerous busy situations in which communications are blocked and not completed. In accordance with an important feature of the invention, the cell index table 200 is instrumental to the operation of the hub arbitrator 80 in selecting various idle voice lines for broadcasting an incoming dispatch voice signal to plural destination radio cells serving the same group. As will be set forth more fully below, the cell index table 200 is updated as to the busy/idle status thereof each time a key data packet 138 or a dekey data packet 150 is received from a radio cell.

Continuing with the initialization routine, program flow block 210 of FIG. 5B is encountered. According to the instructions corresponding to program flow block 210, the radio cell 82 outpulses on the selected voice line the DTMF telephone number of the hub arbitrator 80. In response to the dialing of the hub telephone number, the public switch telephone network 36 applies ringing to the telephone voice line of the hub arbitrator 80. According to program flow block 212, the hub processor 118 receives and detects the ringing on the selected voice line 114, and answers by placing the indexed telephone voice line in an off-hook condition. Once the hub processor 118 places the selected telephone voice line in an off-hook condition (block 212), the cell processor detects the same and transmits by way of DTMF signals the correlator number on the selected voice line. This is shown in program flow block 214 of FIG. 5B. The correlator number transmitted on the selected voice line is the same correlator number decoded from the INIT data packet 152 received by the cell according to program flow block 184 of FIG. 5A. After such transmission by the cell processor, the processor returns to the main program and is thus complete as to the initialization routine.

As noted in program flow block 216 of FIG. 5B, the hub processor 118 receives the DTMF correlator number from the radio cell, decodes the DTMF signals to corresponding digital signals, and verifies that the correlator ID matches that which was transmitted to the cell in the INIT data packet 152 according to program flow block 182. While not shown, if the correlator number does not match, retransmissions and retry attempts can be made, and/or various error signals can be displayed so that the problem can be found. In any event, when a match is found of the correlator numbers according to program flow block 216, processing continues to program flow block 218. In program flow block 218, the hub processor 118 maintains the selected telephone voice line in an off-hook condition. In this manner, a complete voice transmission path has been established between the radio cell and the hub arbitrator 80. Moreover, the radio cell tables and the cell index table 200 of the hub processor 118 have both assigned a single unique identity to the same telephone voice line. In this manner, communications can be passed between the hub arbitrator 80 and the radio cell, via the data line 110, in order for both the radio cell and the hub arbitrator 80 to select the same telephone voice line on which to transmit voice signals. As noted above, different voice lines may be utilized during the many key and rekey commands of a radio transceiver in carrying out communications of the dispatch-type between users of radio transceivers in the same group.

With reference again to FIG. 5B, the hub processor 118 then proceeds to decision block 220, where a visual prompt is provided to the operator or craftsperson to determine if all of the voice lines to all of the cells have been initialized by identifying the lines with unique identities and placing such lines in an off-hook condition. If the result in accordance with decision block 220 is negative, the operator inputs the index number of the next voice line or the next radio cell and processing branches to program flow block 222. Here, the hub processor 118 receives data from the operator to select the next radio cell and/or the next voice line and proceeds through all of the network cells. Processing branches from FIG. 5B back to program flow block 174 of FIG. 5A, where another correlator ID is randomly selected by the hub processor 118. Processing branches again through the flow chart of FIGS. 5A and 5B, whereupon each telephone voice line of each radio cell in the network is initialized. When all of the telephone voice lines of all of the radio cells in the network have been initialized in the manner set forth above, the hub processor 118 returns to the main program, as noted in the return instruction of block 224.

It should be appreciated that various communications between the hub arbitrator 80 and the particular radio cell may involve various "handshake" signals that are not specifically shown in the software flow chart. Further, the failure to establish communication therebetween may result in signals to craftspersons showing that an error has occurred, and the type of error. Again, such details are well known to those skilled in the art and not specifically shown in the flow charts.

In the preferred form of the initialization routine 170, the telephone lines, whether they be data lines 96, 110 or voice lines 104, 106, 114, are maintained in an off-hook condition for a predefined period of time, such as 24 hours. The time period is programmable via the hub arbitrator 80. Should a data line or voice line be placed in an on-hook condition after expiration of the predefined period of time, the hub arbitrator 80 is programmed to automatically initialize such data or voice line without assistance by the operator. If a voice line were to be placed in an on-hook condition, and subsequently were needed, the hub arbitrator 80 would proceed through the initialization measures described above for that specific voice line. On the other hand, if a data line were to be placed on an on-hook condition, and subsequently was needed, then the data line and all the associated voice lines would undergo the initialization procedures described above. Those skilled in the art may find that it is more expedient to simply maintain all voice and data lines permanently in an off-hook condition. Even if this latter option is desired, an automatic initialization would nevertheless be beneficial should any line be inadvertently placed in an on-hook condition due to anomalies in the radio cells, hub arbitrator or the public switched telephone network 36, or due to electrical interference that may affect the lines.

After completing the initialization of the voice and data lines between the various network cells and the hub arbitrator 80, the network is ready for completing dispatch-type of radio communications between the radio cells. It should be noted that prior to and during the initialization phase, the individual radio cells can nonetheless carry out local dispatch communications between the transceivers serviced in the vicinity of the respective radio cell.

Figure 7A:
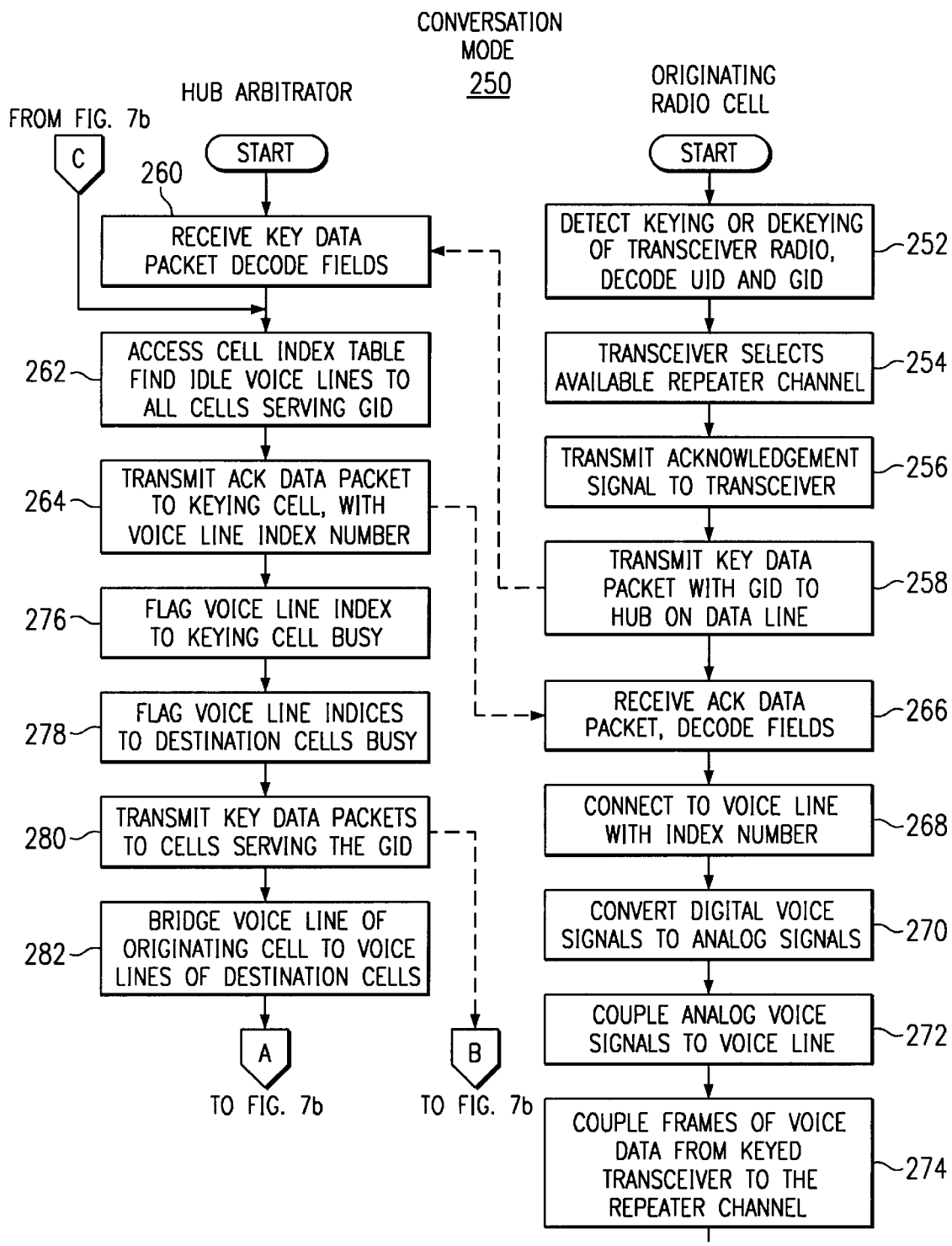
FIGS. 7a and 7b are flow charts of the operations carried out by the network system in the conversation mode.
Figure 7B:
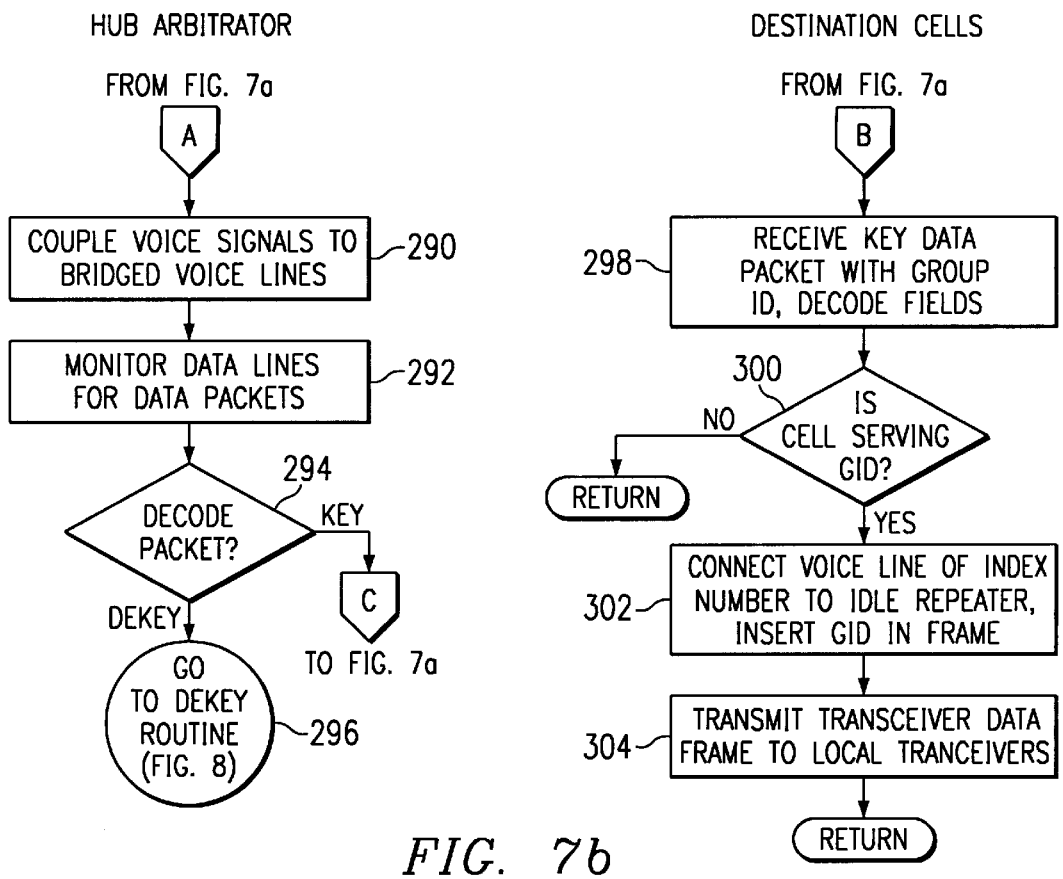

FIGS. 7A and 7B illustrate the programmed operations of the conversation mode 250 carried out by the hub arbitrator 80 as well as the originating and destination radio cells to provide networking of dispatch communications. A dispatch communication starts or originates with a radio cell when a transceiver is keyed so as to transmit voice signals to other transceivers of the group. Program flow chart 252 illustrates the software instructions carried out by the processor of the originating radio cell, whereupon the data frame of the ESAS protocol is detected and the various fields thereof are decoded. The relevant fields include the transceiver unique identity code and the group identity code. Assuming for purposes of example that one transceiver of a specific group was keyed, the transceiver selects an available repeater channel, as shown in program flow block 254. Then, the radio cell processor transmits an acknowledgement signal, and the keyed transceiver provides an audible "beep." This is noted in block 256. In this manner, the user of the keyed transceiver recognizes the audio beep and knows that a repeater channel has been allocated for the transmission of voice signals, and talking can commence. The processor of the originating radio cell then arranges and transmits a frame 120 having a key data packet 138 with the GID embedded therein, as noted in program flow block 258. As noted above, key, ACK and dekey data packets transmitted from radio cells to the hub arbitrator 80 do not include index data in the index fields thereof.

In the hub arbitrator 80, the processor 118 receives the key data packet 138 and decodes the various fields thereof (block 260). The receipt of the key data packet 138 indicates to the hub processor 118 that idle telephone voice lines to all of the destination cells should be selected for receiving the analog voice signals transmitted by the keyed transceiver. In program flow block 262, the hub processor 118 accesses the cell index table 200 to select a respective idle voice line to each of the radio cells serving the group ID decoded from the key data packet 138. An idle telephone voice line extended to the originating radio cell is also selected in the cell index table 200, whereupon the hub arbitrator 80 transmits an ACK data packet 146 to the originating cell, together with the index number of the idle voice line to be used.

With regard to the originating radio cell, the ACK data packet 146 is received and the fields thereof are decoded. This is shown in program flow chart 266. The originating radio cell then establishes a connection to the idle voice line corresponding to the index number received in the ACK data packet 146. The digitized voice signal received by the originating radio cell in the ESAS data packet from the transceiver is converted to corresponding analog signals, as shown in program flow block 270. The analog signals are then coupled to the selected voice line, also as illustrated in program flow block 272. If the voice lines happen to be digital carrier lines, then the voice signals are maintained in digital form and transmitted as digital carrier signals. The originating radio cell also couples the ESAS frames of voice data from the keyed transceiver to the repeater channel selected in program flow block 254. With this arrangement, as long as the push-to-talk switch of the transceiver remains depressed by the user, the analog voice signals continue to be coupled to the allocated telephone voice line, and the ESAS data frames from the transceiver continue to be coupled to the repeater channel and broadcast locally within the area served by the originating radio cell.

Returning to the hub arbitrator 80, and particularly to program flow block 276, the voice line extending to the originating cell is flagged or otherwise marked "busy" in the voice line index table 200. Also, and as shown in program flow block 278, the idle voice lines extending to the destination cells are also flagged as "busy." The hub processor 118 arranges and transmits key data packets 138 on the data lines to each of the other cells in the network (block 280). Additionally, the hub processor 118 controls the hub switching network 116 to bridge the voice line extending to the originating radio cell to the plural voice lines extending to the destination cells. This is shown in program flow block 282.

As shown in FIG. 7B, the hub processor 118 couples the voice signals to the bridged voice lines that are extended to the destination cells. In this manner, the transmitted analog voice signals routed from the originating radio cell are coupled in parallel over the bridged voice lines and broadcast to each of the destination radio cells. As noted in program flow block 292, the hub processor 118 monitors the data lines for any other data packets, as may be detected by the respective modems 112. In decision block 294, if a data packet is received, the hub processor 118 determines whether the command field corresponds to a key data packet 138 or a dekey data packet 150. If a key command is detected, branching returns to program flow block 262 of FIG. 7A. On the other hand, if a dekey data packet 150 is detected, processing branches to the end of transmission mode shown in FIG. 8.

Returning to the conversation mode 250, and with respect to the destination radio cells, there is illustrated in FIG. 7B at program flow block 298 the instructions corresponding to the receipt of the key data packet 138 on a data line. The key data packet 138 is transmitted with the group ID and the voice line index field. The key data packet is decoded by the destination cell processor, and the group ID is compared with the group IDs of the transceivers presently serviced in the area of the destination cell. If the group ID of the key data packet 138 is not found to be served by the destination cell, processing branches to the main routine. If, on the other hand, the destination radio cell is currently serving one or more transceivers associated with the group ID, the destination radio cell connects the voice line associated with the index number transmitted in the key data packet 138. This is shown by the instructions corresponding to program flow block 302. In addition, the destination cell inserts the group ID received from the key data packet 138 into an LTR frame for transmitting according to the LTR protocol. As noted in program flow block 304, the destination radio cell transmits transceiver data frames to the local transceivers in the area serviced by the destination radio cell. Those transceivers preprogrammed with the corresponding group ID process the LTR data frame and compare the received group ID with the group ID programmed therein. If a match is found, the user of the transceiver hears the words spoken into the keyed transceiver of the originating cell. As can be appreciated, the set up of the various data frames and the transmission of the same to originating and destination cells occurs very quickly and thus a very small real time delay is involved. In accordance with an important feature of the invention, because the voice lines connecting the hub arbitrator 80 to all of the networked cells remain in an off-hook condition, there is no delay involved in seizing the telephone lines and transmitting the voice signals thereon.

In accordance with the typical dispatch-type of communication, a transmission of the voice signals throughout the networked cells may only occur for one or a few seconds, until the push-to-talk switch on the transceiver is released. When released, all of the associated voice lines are idled, but remain off-hook. When another transceiver in the same group, or in a different group, keys the push-to-talk switch on the transceiver, the same procedure described in connection with FIGS. 7A and 7B is carried out to transmit the voice signals locally in the vicinity of their originating cell, as well as to broadcast the voice signals to the other destination radio cells of the network. In a typical application of dispatch-type communications, many groups can be involved, and many simultaneous key and dekey communications will be occurring on a concurrent basis. In order to provide completion of the calls throughout the network, the hub arbitrator 80 must continually select voice lines during transmissions of voice signals, and thereafter immediately idle such voice lines so as to make them available for other transmissions. To that end, the hub arbitrator 80 functions as a central controller to carry out a trunking of the numerous voice lines of the respective cells interconnected together via the hub switching network 116 of the hub arbitrator 80.

According to the standard utilization of the LTR protocol, up to about 5,100 groups of transceiver radios can be utilized in conjunction with a single cell. This large number of groups results from the possible utilization of up to twenty repeaters per radio cell, where each radio cell accommodates up to 255 groups per repeater. As can be appreciated, without the capability of trunking the telephone voice lines, a significantly large number of voice lines would be required to prevent blocking of telephone calls in high-traffic time periods. In other words, if trunking capabilities were not utilized on the simultaneous transmission of ten different groups of transceivers, ten voice lines would be required, and all lines would be busy at the same time. Further, if an eleventh transceiver group desired communication to be networked, service would be denied by the hub arbitrator 80, whereupon a NAK data packet 148 would be transmitted on the data line back to the originating cell. Only local repeater transmission would then occur.

Figure 9:
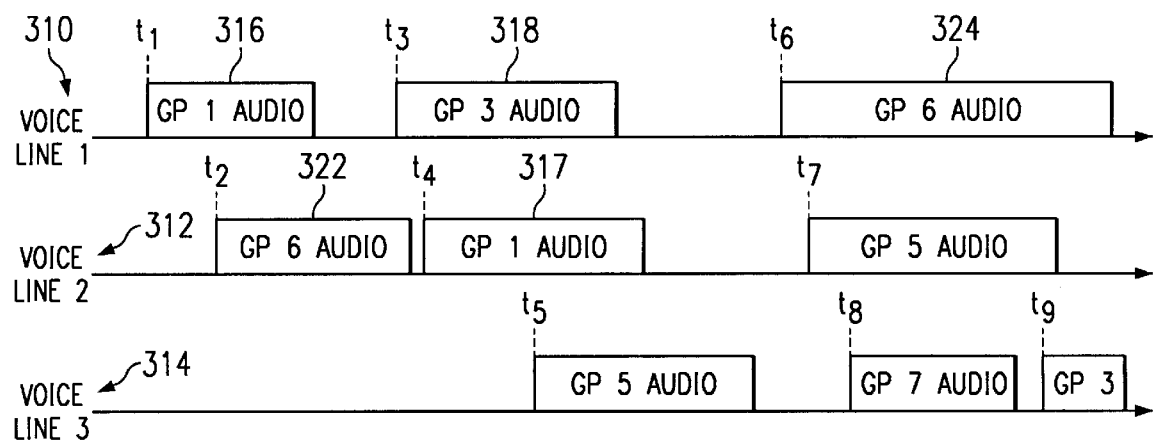
FIG. 9 is a time diagram illustrating the trunking of dispatch communications on plural voice telephone lines.

The trunking of the voice telephone lines can be better understood by reference to FIG. 9. As an example, FIG. 9 illustrates three telephone voice lines 310, 312 and 314 that connect one radio cell to other radio cells in a network via the hub arbitrator 80. Associated with each telephone voice line, there are shown individual blocks indicating the time in which a transceiver is keyed and actual spoken voice signals are carried by the line. In addition, each time period of a spoken message is identified by a group number associated with the group in which the keyed transceiver is assigned. Time is shown as extending to the right in the drawing of FIG. 9. Further, with regard to each block, it is noted that the rising edge of the block corresponds somewhat to the time in which the push-to-talk switch of a transceiver was operated, and the falling edge of the block corresponds generally to the time in which the push-to-talk switch was released. It should be appreciated that corresponding ACK and NAK data packets are transferred on the respective data lines in conjunction with such rising and falling edges as described above. It should also be noted that while only three voice telephone lines are shown, the principle of trunking thereof applies to any other number of voice lines. Also, it should be noted that the assignment or trunking of the various telephone lines to couple analog voice signals is carried out by the hub arbitrator 80.

Various voice line selection algorithms may be employed by the hub arbitrator 80. In the preferred form of the invention, a first voice line 310 is always selected first. If the first voice line 310 is busy at that instant, then the second voice line 312 is selected, and so on. It can be seen that the first voice line 310 is selected more frequently than the other voice lines, and thus it is the busiest. The hub arbitrator 80 can be programmed to maintain a record of the number of times that each voice line was selected, and/or the number of times all voice lines were busy and communications were denied to a user. With this information it can be determined if more or fewer voice lines will be required in order to provide dispatch communication services without wasting resources. It should also be noted that the various audio message blocks need not all be carried in the same direction on the same telephone voice line. Rather, since telephone voice lines are bi-directional signal carriers, the group one audio 316 carried by the first voice line 310 may be transferred from originating cell 82 to the destination cells 90–94, while the group three audio 318 may be carried in an opposite direction on the first voice line 310 a short time later from an originating cell 94 to the destination cells 82, 90 and 92.

In the illustration of FIG. 9, at time $t_1$, a group one transceiver was keyed and the audio 316 was transferred on the first voice line 310 to destination cells. Assume further that a short time later at $t_4$, the group one transceiver was again keyed for transmitting audio 317. However, since at time $t_3$, the first voice line 310 was already carrying the group three audio 318, the hub processor 118 selected the second voice line 312 as it was idle at time $t_4$. Of course, the trunking by the hub processor 118 of the telephone voice lines is completely transparent to the transceiver radio users. In like manner, at time $t_2$, the hub processor 118 selected the second voice line 312 for carrying the group six audio 322. At some time subsequent thereto, e.g., time $t_6$, the hub processor 118 selected the first voice line 310 for carrying a second audio message 324 of group six. It is noted that at time $t_6$, the second voice line 312 was also idle. However, in accordance with the selection algorithm of the processor 118, the entries of the cell index table 200 are accessed, starting with the first voice line 310, and only if it is busy, selecting the second voice line 312. Only if the first and second voice lines are busy, the hub processor 118 considers the third voice line 314 in an attempt to find an idle voice line. As noted above, many other selection algorithms can be employed to efficiently select an idle voice line for carrying audio signals from an originating cell to be broadcast to plural destination cells. In the foregoing example, it can be seen that with only three telephone voice lines 310, 312 and 314, six different radios in six different groups were able to communicate without being blocked. It can be appreciated that by maintaining the telephone voice lines in an off-hook condition, less set-up time is required and thus brief bursts of analog voice signals are not lost.

In view that a single hub arbitrator 80 coordinates the selection and allocation of the voice lines, conflicts of usage thereof are avoided. In processing data packets received from the radio cells, the hub arbitrator 80 places such requests in a first-in, first-out queue. Thus, each request, such as a key or dekey request, is serialized in the queue and thus collision avoidance of simultaneous requests is eliminated. Moreover, since only a single processor is programmed to coordinate the requests, the conflict of requests, which is a problem in multi processor network systems, is overcome.

Figure 8:
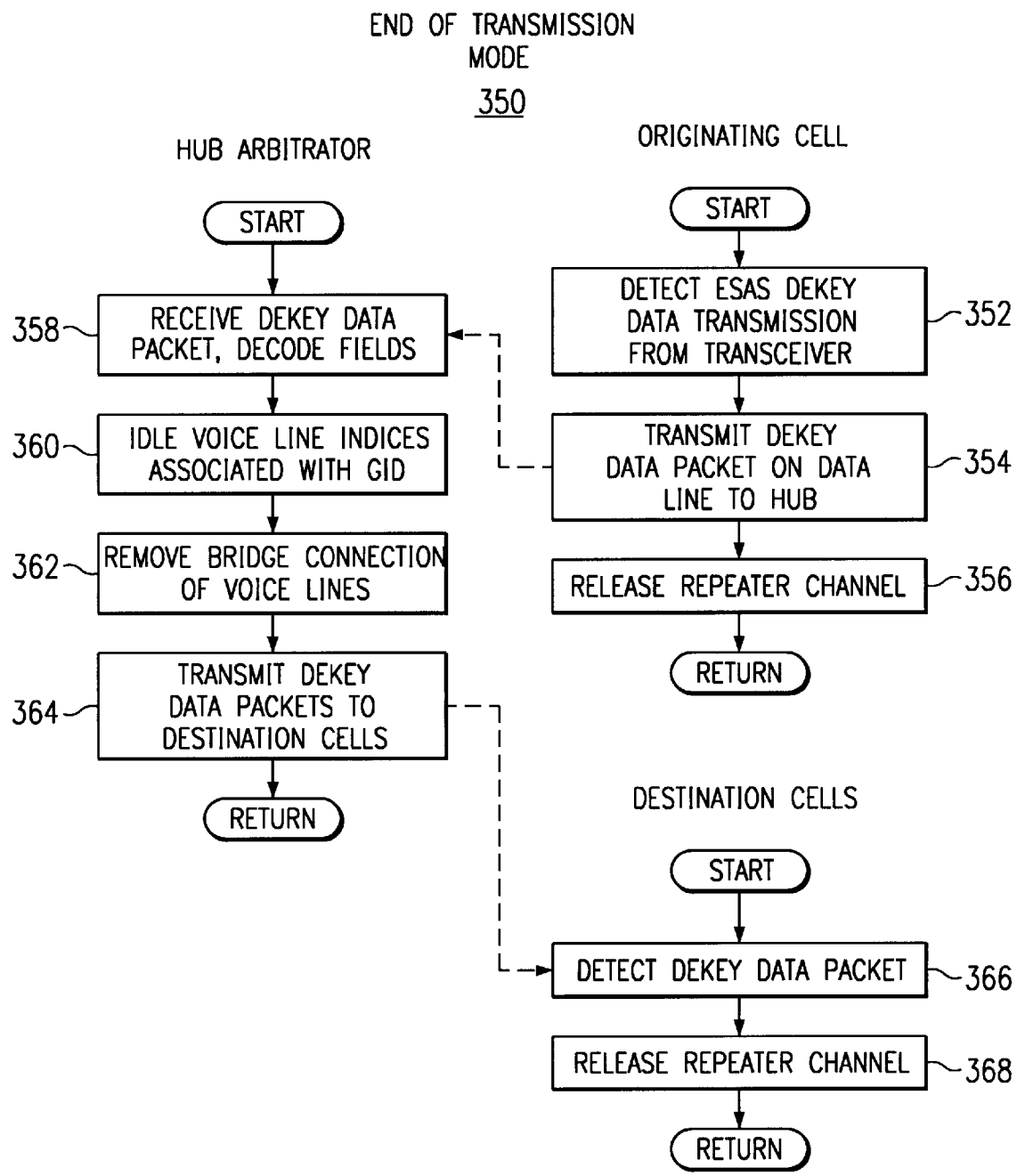
FIG. 8 is a software flow chart of the end of transmission mode carried out by the network system according to the invention.

With reference to FIG. 8, there is illustrated the end of transmission mode 350 programmed in the processor 118 of the hub arbitrator 80, as well as programmed in each of the radio cells. As will be described below, the end of transmission mode 350 involves the programmed operation in the hub arbitrator 80 and the radio cells, in response to the dekey, or release of the push-to-talk switch of a radio transceiver.

The end of transmission mode 350 commences in a radio cell, identified as the originating cell in FIG. 8. Here, the processor of the originating radio cell is programmed to detect an LTR dekey data transmission from a transceiver. This is shown in program flow block 352. The processor in the originating cell then transmits the dekey data packet 150 in the data frame 120, on a data line to the hub arbitrator 80. With regard to the originating radio cell, the repeater channel carrying the dekey transmission from the transceiver is then released, as noted in program flow block 356.

In response to the receipt of the dekey data packet 150 by a modem 112 in the hub arbitrator 80, the hub arbitrator processor 118 decodes the various fields of the data packet. This is shown in program flow block 358. The hub processor 118 then accesses the voice line index table 200 and flags the respective voice lines as being idle, even though such voice lines remain off-hook. In view that the dekey data packet 150 identifies the group ID in the field 142, the hub processor 118 can uniquely identify which voice line to idle with regard to the group ID received in the dekey data packet 150. The operations according to program flow block 362 show that the hub arbitrator 80 removes the bridged connection in the switching network 116 between the telephone voice lines coupled between the originating radio cell and the plural destination radio cells. In program flow block 364, the hub processor 118 transmits a dekey data packet 150, including the index field 144, to each of the destination radio cells, via the respective data lines.

With regard to the destination radio cells, shown as such in FIG. 8, each such cell receives the dekey data packets and decodes the various fields therein. This is shown in program flow block 366. The repeater in each destination radio cell dedicated to the dispatch communication is then released, as shown by program flow block 368. It can be seen that the end of transmission mode 350 is effective to idle all of the voice lines and corresponding radio repeaters, thus allowing such equipment to be utilized for a subsequent dispatch transmission or reception.

From the foregoing, disclosed are methods and apparatus for networking dispatch-type of communications. A hub arbitrator functions as a master processor in allocating various telephone voice lines to be used in coupling dispatch voice signals from an originating cell to plural destination cells. Further, a data transmission protocol carried out on separate data lines is efficient in communicating signals between the hub arbitrator and the various radio cells as to the type of communication to be carried, as well as which telephone voice line to be employed at that point in time. Further, the number of radio cells that can be networked together to participate in dispatch-type of calls is not limited. It should also be noted that the invention can be readily adapted for accommodating "roaming" functions of mobile radios so that each radio cell is made aware of the presence of a transceiver in a particular group. Thus, irrespective of the geographical location of a transceiver within the wide area coverage of a network, such transceiver can either transmit or receive voice messages from others in the assigned group.

While the preferred embodiment of the method and apparatus has been disclosed with reference to specific radio cell and network configurations, it is to be understood many changes in detail may be made as a matter of engineering choices without departing from the scope of the invention as defined by the appended claims. Indeed, those skilled in the art may prefer to embody the apparatus in other forms, and in light of the present description they will find it easy to implement that choice. Also, it is not necessary to adopt all of the various advantageous features of the present disclosure into a single composite networked arrangement in order to realize the individual advantages.

What is claimed is:

1. A dispatch-type of communication system having a plurality of radio cells networked together, comprising:

a plurality of radio cells, each including a processor for controlling a respective plurality of repeaters for servicing a plurality of radio transceivers in a predefined geographical area, and each including a modem and plural voice ports;

a hub arbitrator having a programmed processor, a switching network and a plurality of modems;

a plurality of voice lines coupled between the voice ports of each said radio cell and the hub arbitrator switching network via a public switched network;

a data line, separate from said voice lines, coupled between a modem of each respective radio cell and a respective modem of said hub arbitrator, via said public switched network; and said hub arbitrator processor and each said radio cell processor being programmed to transmit and receive via said data lines, packets of data including a field dedicated to identifying a group of transceivers associated with at least one said radio cell, and said hub arbitrator processor being programmed to select one said voice line between a radio cell transmitting a voice message and a plurality of radio cells receiving said voice message.

2. A dispatch-type of communication system having a plurality of radio cells networked together, comprising:

a plurality of radio cells, each serving a respective plurality of dispatch-type radios, each said radio cell including a processor and a plurality of repeaters for trunking dispatch communications;

a programmed hub controller;

a respective data line and at least one respective voice line connecting each said radio cell to said hub controller, said data lines and said voice lines being maintained off-hook to thereby expedite communications; and said hub controller having a connection bridge for connecting an incoming voice line to plural outgoing voice lines to thereby broadcast an originating voice message from one said radio cell to plural destination radio cells, said hub controller being programmed to maintain a busy/idle table of the voice lines, and said hub controller being programmed to respond to a key request of a radio to select an idle voice line coupled to each destination radio cell for transmission of a voice message following the key request, and to idle the voice line in response to a dekey request of the radio.

3. The communication system of claim 2, wherein said voice lines are coupled from the respective radio cells to said hub controller via a public switched telephone network.

4. The communication system of claim 2, further including a bridging circuit for coupling voice signals originating from one said radio cell to a plurality of destination radio cells via a corresponding plurality of voice lines.

5. A dispatch-type communication system having a plurality of radio cells networked together, comprising:

a first radio cell having a plurality of radios and a plurality of repeaters for trunking communications to said radios;

a second radio cell having a plurality of radios and a plurality of repeaters for trunking communications to said radios associated with said second radio cell; and a programmed central controller coupled to said first radio cell and said second radio cell by respective telephone lines, said central controller being programmed to select respective idle telephone lines connected to said first and second radio cells in response to dispatch-type of communications therebetween.

6. The communication system of claim 5, wherein said telephone lines include voice telephone lines and data telephone lines, and further including a modem in each said radio cell for transmitting dispatch call set-up data signals on said data lines to said central controller.

7. The communication system of claim 5, wherein said central controller includes a voice bridge for receiving a dispatch voice message on a telephone line and coupling said voice message via plural telephone lines to a corresponding plurality of destination radio cells.

8. The communication system of claim 5, wherein said central controller is programmed to maintain a busy/idle table of the telephone lines connected to the radio cells, and programmed to select idle telephone lines to transfer dispatch voice communications thereon.

9. The communication system of claim 8, wherein said central controller is programmed to select various different idle telephone lines during a bi-directional dispatch communication.

10. In a dispatch-type of communication system having a plurality of radio cells networked together, a method of trunking voice lines coupled between said radio cells, comprising the steps of:

placing at least two voice lines coupled to each said radio cell in an operational mode for carrying voice signals;

receiving by a first radio cell originating a unidirectional voice message, an identification of a first voice line of the plurality of voice lines on which to transmit voice signals;

receiving by at least one second radio cell an identification of one voice line of the plurality of voice lines on which to receive the transmitted voice signals;

receiving by said first and second radio cells an identification of a second voice line on which to carry a voice message in response to the transmitted voice message; and transmitting a unidirectional response voice message over said second voice line from said second radio cell to said first radio cell.

11. The method of claim 10, further including trunking said first and second voice lines by a hub controller for carrying separate voice signals between a third and fourth radio cell.

12. A dispatch communication system for carrying out the method of claim 10.

13. The method of claim 10, further including receiving said identifications by said first radio cell and said second radio cell from a hub controller, and coupling said first and second voice lines respectively to said first and second radio cells via said hub controller.

14. The method of claim 13, further including transmitting said identifications to said first and second radio cells by a hub controller via data lines separate from said voice lines.

15. A method of carrying out a dispatch-type of communication in which a push-to-talk action in one radio cell results in a message broadcast to a destination radio cell, comprising the steps of:

in response to a push-to-talk request in said one radio cell, transferring a data request to a central controller;

selecting by said central controller a first idle voice line connected to said one radio cell;

transmitting by said central controller to said destination radio cell an identification of an originating communication corresponding to said push-to-talk request;

selecting by said destination radio cell, based on the identification of said originating communication, at least one destination radio receiver; and allowing by said central controller a broadcast of voice signals associated with the push-to-talk communication from said one radio cell via the selected telephone voice line to said selected destination radio receiver to receive the voice signals.

16. The method of claim 15, further including selecting by said controller a second idle voice line connected to the destination radio cell, and transferring the broadcast voice signals carried on the first voice line to the second voice line.

17. The method of claim 15, further including placing said first voice line in an off-hook condition prior to initiation of said push-to-talk request.

18. The method of claim 15, further including trunking said first voice line so as to carry voice signals originating at different radio cells.

19. The method of claim 15, further including a plurality of off-hook voice lines coupled between said one radio cell and said central controller, and utilizing more than one said off-hook voice line during a bidirectional dispatch communication between said one radio cell and said destination radio cell.

20. The method of claim 15, further including transmitting the voice signals corresponding to said originating communication by said one radio cell to a plurality of radios in a local geographical area of coverage of said one radio cell.

21. The method of claim 15, further including maintaining by said central controller a busy/idle table of the voice lines coupled to said originating radio cell and to said destination radio cell.

22. The method of claim 15, further including carrying out a full duplex communication without utilizing said central controller to select busy/idle telephone lines during the communication.

23. The method of claim 15, further including initially connecting said first radio cell to said central controller with at least one pair of telephone lines, and dedicating one said telephone line for trunked voice communications and dedicating another said telephone line for data packet transmission, and maintaining said pair of telephone lines in an off-hook condition.

24. The method of claim 23, further including programming said central controller to carry out an initialization procedure that establishes the off-hook data telephone line and the off-hook telephone voice line to said originating radio cell and destination radio cells, and thereafter maintains said data and voice telephone lines in respective off-hook conditions.

25. The method of claim 15, further including utilizing at least one off-hook telephone line connecting said one radio cell to said central controller for voice communications, and at least one off-hook data line connecting said one radio cell to said central controller for data communications.

26. The method of claim 25, further including transmitting on said data line a packet of data identifying a type of command.

27. The method of claim 26, wherein said one radio cell includes a plurality of groups of push-to-talk radios, and further including a group identification associated with each said group of radios, and further including the step of transmitting a group identification with each said push-to-talk request.

28. The method of claim 15, further including transmitting by said central controller to a plurality of different destination radio cells the identification of the originating communication, and broadcasting the voice signals corresponding to the originating communication via respective voice lines to said plural destination radio cells.

29. The method of claim 28, further including broadcasting the voice signals corresponding to the originating communication to each said destination radio cell via a different said voice line.

30. The method of claim 29, further including bridging by said central controller the voice signals corresponding to the originating communication to said plural voice lines coupled to the respective destination radio cells.

* * * * *